UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BROWN SULFUR DYE AND PROCESS OF MAKING SAME.

SPECIFICATION forming part of Letters Patent No. 660,067, dated October 16, 1900.

Application filed August 29, 1899. Serial No. 728,864. (Specimens.)

*To all whom it may concern:*

Be it known that I, ARTHUR WEINBERG, a citizen of Prussia, and a resident of Frankfort-on-the-Main, Hesse-Nassau, Germany, have invented new and useful Improvements in Brown Dyes and Processes of Making Same, of which the following is a specification.

This invention relates to the manufacture of a new brown coloring-matter which fixes itself on the vegetable fiber without the aid of a mordant.

The process of the manufacture of my new dye consists in the following operations: First, m-amido-o-cresol is heated together with dinitro-chlorbenzene and a neutralizing agent, such as carbonate of lime or acetate of soda; second, the dinitrophenyl-oxytolyl-amin thus produced is treated with nitric acid and transformed hereby into a polynitro derivative; third, this polynitro compound is heated with sulfids and sulfur.

The following example will illustrate the manner in which my invention can be carried out:

Example: The aqueous solution of ten kilos p-amido-o-cresol ($CH_3:OH:NH_2 = 1:2:4$) is boiled during several hours with 16.5 kilos dinitro-chlorbenzene and fifteen kilos acetate of sodium. Ten kilos of the dinitro-phenyl-oxytolyl-amin thus obtained are dissolved in one hundred kilos sulfuric acid of 66° Baumé and at a temperature of about 5° centigrade. Ten kilos of a mixture of nitric acid and sulfuric acid, containing 4.4 kilos $HNO_3$, are slowly introduced. After all nitric acid has been added the nitration is kept standing for several hours and then diluted with ice. Tetranitro-oxyphenyl-tolyl-amin separates in the form of an orange-colored precipitate, which is filtered off, washed, and dried. Ten kilos of this tetranitro-oxyphenyl-tolyl-amin are heated with sixty kilos sulfid of sodium and fifteen kilos sulfur and some water up to about 120° centigrade. The thus-obtained coloring-matter dyes unmordanted cotton brown shades. By treating those dyeings with metallic salts, especially copper salts and bichromates, the shades turn to a more yellowish brown.

The dyestuff further possesses the very remarkable property, which has not yet been stated in the class of colors it belongs to, of being transformed by nitrous acid into a diazo compound, and can therefore be developed on the fiber by the known diazotizing process.

What I claim as new, and desire to secure by Letters Patent, is—

1. The new substantive brown dyestuff which is obtained in the form of black lumps or black powder, by heating polynitro-oxyphenyl-tolyl-amin with sulfids and sulfur, which dissolves easily in water with a dark-brown color, being precipitated from this solution by acids, dyeing unmordanted cotton brown shades, which can be diazotized and developed on the fiber, substantially as described.

2. The herein-described process for the manufacture of a substantive brown dyestuff which process consists in heating amido-cresol with dinitro-chlorbenzene, treating the product with nitric acid and melting the polynitro compound thus produced together with sulfids and sulfur substantially as described.

In testimony whereof I have signed my name to this specification in the presence of two subscribing witnesses.

ARTHUR WEINBERG.

Witnesses:
JEAN GRUND,
CARL GRUND.